(12) United States Patent
Zheng (10) Patent No.: US 11,279,171 B2
(45) Date of Patent: Mar. 22, 2022

(54) FIXING DEVICE FOR REPAIRING ALUMINUM ALLOY WHEEL HUB AND USING METHOD THEREOF

(71) Applicant: CITIC Dicastal CO., LTD., Hebei (CN)

(72) Inventor: Liqun Zheng, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 453 days.

(21) Appl. No.: 16/503,542

(22) Filed: Jul. 4, 2019

(65) Prior Publication Data
US 2020/0171880 A1   Jun. 4, 2020

(30) Foreign Application Priority Data
Dec. 4, 2018   (CN) .......................... 201811473240.8

(51) Int. Cl.
*B23P 6/00*         (2006.01)
*B25H 1/10*         (2006.01)
(Continued)

(52) U.S. Cl.
CPC ................ *B60B 27/00* (2013.01); *B23P 6/00* (2013.01); *B25H 1/10* (2013.01); *B25H 1/16* (2013.01); *B60B 5/02* (2013.01); *B23P 2700/50* (2013.01)

(58) Field of Classification Search
CPC . B60B 27/00; B60B 5/02; B60B 21/00; B23P 6/00; B23P 2700/00; B25H 1/10;
(Continued)

(56) References Cited

U.S. PATENT DOCUMENTS 1,650,216 A * 11/1927 Ingham ..................... B21D 1/10
                                                        72/316
2,233,371 A *  2/1941 Smith ........................ B21D 1/10
                                                        73/487
(Continued)

FOREIGN PATENT DOCUMENTS

EP   1116529 A2   7/2001
ES   2216670 A1   10/2004

OTHER PUBLICATIONS

European Search Report in the European application No. 19205996.2, dated May 27, 2020.

*Primary Examiner* — Joseph J Hail
*Assistant Examiner* — J Stephen Taylor
(74) *Attorney, Agent, or Firm* — Syncoda LLC; Feng Ma (57) ABSTRACT

A fixing device for repairing an aluminum alloy wheel hub includes a base and universal wheels connected with the bottom of the base through support legs, wherein one side of the bottom plate is connected with air cylinders; the top of the bottom plate is connected with a fixing plate through a rotating shaft mounted rotationally; corresponding sides of vertical plates at the two sides of the fixing plate are each connected with a pressing plate through two sets of springs; adjusting bolts penetrate through the middles of the vertical plates; a first groove is formed in the middle of the fixing plate; two sets of guide rollers are rotationally mounted in the first groove; a top plate is fixedly mounted at the top of the bracket; a push plate is connected with the bottom of the top plate through a second hydraulic cylinder.

9 Claims, 5 Drawing Sheets

(51) Int. Cl.
*B25H 1/16* (2006.01)
*B60B 27/00* (2006.01)
*B60B 5/02* (2006.01)

(58) Field of Classification Search
CPC .. B25H 1/16; B21D 3/14; B21D 53/30; Y10T 29/4975; Y10T 29/53996
See application file for complete search history.

(56) References Cited

U.S. PATENT DOCUMENTS

| | | | |
|---|---|---|---|
| 2,489,815 A * | 11/1949 | Rader | B21D 1/10 |
| | | | 72/311 |
| 4,910,986 A | 3/1990 | Funkhouser | |
| 5,303,573 A * | 4/1994 | Douglas | B21D 1/10 |
| | | | 269/69 |
| 5,634,361 A * | 6/1997 | Herschman | B21D 3/14 |
| | | | 72/31.02 |
| 6,367,303 B1 * | 4/2002 | Hizono | B21D 53/30 |
| | | | 72/316 |

* cited by examiner

FIXING DEVICE FOR REPAIRING ALUMINUM ALLOY WHEEL HUB AND USING METHOD THEREOF

CROSS-REFERENCE TO RELATED APPLICATIONS

The present application claims benefit of Chinese Application No. 201811473240.8 filed on Dec. 4, 2018, the disclosure of which is hereby incorporated by reference in its entirety.

BACKGROUND

In the fixing process during repairing of aluminum alloy wheel hubs, existing fixing devices for repairing the wheel hub cannot simultaneously clamp and fix the wheel hub when the wheel hub is horizontally and vertically placed, the height and the position of the fixed structure are inconvenient to adjust, and deformed parts of the wheel hub are inconvenient to stretch and extrude, and consequently operation during repairing is unsatisfactory.

SUMMARY

The present disclosure belongs to the technical field of aluminum alloy wheel hubs, particularly relates to a fixing device for repairing an aluminum alloy wheel hub, and further relates to a using method of the fixing device for repairing the aluminum alloy wheel hub.

The object of the present disclosure is to provide a fixing device for repairing an aluminum alloy wheel hub, through the fixing device, the wheel hub can be clamped and fixed when the wheel hub is placed horizontally and vertically, the height and position of the fixed wheel hub are convenient to adjust, the deformed parts of the wheel hub can be subjected to stretching or extruding repair conveniently, and thus application is convenient.

In order to achieve the object, the present disclosure adopts the following technical scheme that a fixing device for repairing an aluminum alloy wheel hub includes a base and universal wheels connected with the bottom of the base through support legs; the two sides of the top of the base are connected with a support plate through first hydraulic cylinders; a bottom plate is slidably mounted on the support plate through a sliding block; air cylinders fixed to one side of the support plate are connected with one side of the bottom plate; the top of the bottom plate is connected with a fixing plate through a rotating shaft rotationally mounted; corresponding sides of vertical plates at the two sides of the fixing plate are each connected with a pressing plate through two sets of springs; adjusting bolts penetrate through the middles of the vertical plates; a first groove is formed in the middle of the fixing plate; two sets of guide rollers are rotationally mounted in the first groove; one set of the guide rollers and a motor mounted on one side of the bottom of the fixing plate are in drive connection through a belt; baffles are provided on the fixing plate at the tops of the guide rollers; a bracket is rotationally mounted at the position, located on the back side of the fixing plate, above the support plate; a top plate is fixedly mounted at the top of the bracket; a push plate is connected with the bottom of the top plate through a second hydraulic cylinder; the center point of the push plate and the center point of the fixing plate coincide; and the push plate is provided with a positioning hole.

In an embodiment, the position, corresponding to the sliding position of the sliding block, of the support plate may be provided with a matched sliding rail, and the sliding block may be slidably mounted in the sliding rail.

In an embodiment, the vertical plates may be welded on the fixing plate, the bottoms of the pressing plates may not make contact with the fixing plate, and the parts, located on the other sides of the springs, of the pressing plates may be covered with rubber pads.

In an embodiment, the position, corresponding to the mounting position of the motor, of the fixing plate may be provided with a matched second groove.

In an embodiment, the interval between the bottoms of the baffles and the guide rollers may be not less than 5 mm, and collecting grooves may be formed in the middles of the baffles.

In an embodiment, the edges, corresponding to the mounting positions of the baffles, of the first groove of the fixing plate may be provided with flanges.

In an embodiment, the bottom of the bracket may be rotationally connected to the fixing plate through a guide sleeve.

In an embodiment, the vertical plates and the pressing plates may be in the same size, and the longitudinal lengths of the vertical plates and the pressing plates may be less than the longitudinal length of the fixing plate.

In an embodiment, the top of the bracket may be not less than 1 m higher than the top of the fixing plate.

The present disclosure further provides a using method of a fixing device for repairing an aluminum alloy wheel hub, including the following steps that:

S1, an aluminum alloy wheel hub needing to be repaired is horizontally placed on the top of a fixing plate, and pressing plates are pressed on the two sides of the wheel hub for fixing by rotating adjusting bolts on the two sides;

S2, the overall height of a support plate is adjusted through first hydraulic cylinders, and thus the height of the wheel hub on the fixing plate is adjusted for fixing and repair processing;

S3, when deformed parts of the wheel hub need to be stretched or extruded, a push plate at the bottom of a top plate is enabled to face the center of the fixing plate by rotating a bracket, the push plate is pushed by operating a second hydraulic cylinder to repair the deformed parts of the wheel hub through extrusion, or the wheel hub is pulled by a steel wire, so that the wheel hub is connected with the push plate, and the deformed parts are repaired through stretching;

S4, when the wheel hub needs to be vertically placed for repairing, baffles on the fixing plate re taken down, the wheel hub is placed on the two sets of guide rollers, and the pressing plates are pushed to attach to the plane of the wheel hub by rotating the adjusting bolts so as to limit and fix the wheel hub;

S5, when the wheel hub needs to be vertically placed for adjusting, the adjusting bolts are loosened to enable the pressing plates not to make contact with the wheel hub while the wheel hub does not incline, the motor drives one set of guide rollers to rotate, thus, the wheel hub can be driven through the guide rollers to be vertically placed and rotationally adjusted, the adjusting bolts are locked after adjustment, and the pressing plates press the wheel hub.

The fixing device has the technical effects and advantages that compared with the prior art, the fixing device for repairing the aluminum alloy wheel hub has the following advantages that:

1. the fixing device can clamp and fix the wheel hub, regardless of whether the wheel hub is horizontally or vertically placed, by placing the wheel hub on the fixing plate and pushing the pressing plates to clamp and fix the wheel hub through the adjusting bolts;

2. the position height of the wheel hub after fixing can be adjusted through the first hydraulic cylinders, and the fixing plate is rotationally connected with the bottom plate through the rotating shaft, so that the fixed position rotating adjustment is convenient, in addition, by operating the air cylinders connected with one side of the bottom plate, the bottom plate can be pushed to move, thus, the position of the wheel hub is changed, and repair processing is facilitated; and 3. one side of the support plate is connected with the push plate structure connected with the second hydraulic cylinder arranged at the bottom of the top plate through the bracket, so that the push plate can be pushed by the second hydraulic cylinder to move up and down, the deformed parts of the wheel hub can be subjected to stretching or extruding repair conveniently, and application is convenient.

Where, 1 base, 2 universal wheel, 3 first hydraulic cylinder, 4 support plate, 5 bottom plate, 6 air cylinder, 7 sliding block, 701 sliding rail, 8 rotating shaft, 9 fixing plate, 10 vertical plate, 11 spring, 12 pressing plate, 13 adjusting bolt, 14 first groove, 15 guide roller, 16 baffle, 161 flange, 17 bracket, 18 top plate, 19 second hydraulic cylinder, 20 push plate, 21 positioning hole, 22 second groove, 23 motor, 24 belt and 25 guide sleeve.

DETAILED DESCRIPTION

The technical schemes of the embodiments of the present disclosure will be clearly and completely described below with reference to the drawings of the embodiments of the present disclosure.

The present disclosure provides a fixing device for repairing an aluminum alloy wheel hub, as shown in FIG. 1, FIG. 2, FIG. 3, FIG. 4, and FIG. 5. The fixing device includes a base 1 and universal wheels 2 connected with the bottom of the base 1 through support legs, and the device is convenient to move by arranging the universal wheels 2; a support plate 4 is connected with the two sides of the top of the base 1 through first hydraulic cylinders 3; a bottom plate 5 is slidably mounted on the support plate 4 through a sliding block 7; one side of the bottom plate 5 is connected with air cylinders 6 fixed to one side of the support plate 4, the bottom plate 5 can be pushed to move by operating the air cylinders 6, and a structure for fixing the position of the wheel hub can be conveniently adjusted to move left and right; the top of the bottom plate 5 is connected with a fixing plate 9 through a rotating shaft 8 mounted rotationally, the rotating shaft 8 and the bottom plate 5 rotate, and the fixing plate 9 can be driven by rotation of the rotating shaft 8 to rotate for adjustment; corresponding sides of vertical plates 10 at the two sides of the fixing plate 9 are each connected with a pressing plate 12 through two sets of springs 11; the pressing plates 12 can be pushed to move so as to clamp and fix the wheel hub by rotating adjusting bolts 13; the adjusting bolts 13 penetrate through the middles of the vertical plates 10; a first groove 14 is formed in the middle of the fixing plate 9; two sets of guide rollers 15 are rotationally mounted in the first groove 14; one set of guide rollers 15 is in drive connection with a motor 23 mounted on one side of the bottom of the fixing plate 9 through a belt 24, one set of guide rollers 15 are driven by the motor 23 to rotate, and thus the vertically placed wheel hub can be driven to rotate together; baffles 16 are provided on the fixing plate 9 at the tops of the guide rollers 15; the baffles 16 collect chippings and sprayed paint generated during fixing repair in the repair process when the wheel hub is horizontally placed; the baffles 16 are directly taken down from the tops of the guide rollers 15 for rotating application of the guide rollers 15 which are in rotating fit with the wheel hub when the wheel hub needs to be vertically placed; a bracket 17 is rotationally mounted at the position, located on the back side of the fixing plate 9, above the support plate 4; a top plate 18 is fixedly mounted at the top of the bracket 17; a push plate 20 is connected with the bottom of the top plate 18 through a second hydraulic cylinder 19; the center point of the push plate 20 and the center point of the fixing plate 9 coincide; the push plate 20 is provided with a positioning hole 21; and the positioning hole 21 can be connected with the fixed wheel hub through a pulling rope, so that stretching repair of the deformed parts is facilitated.

Figure 2:
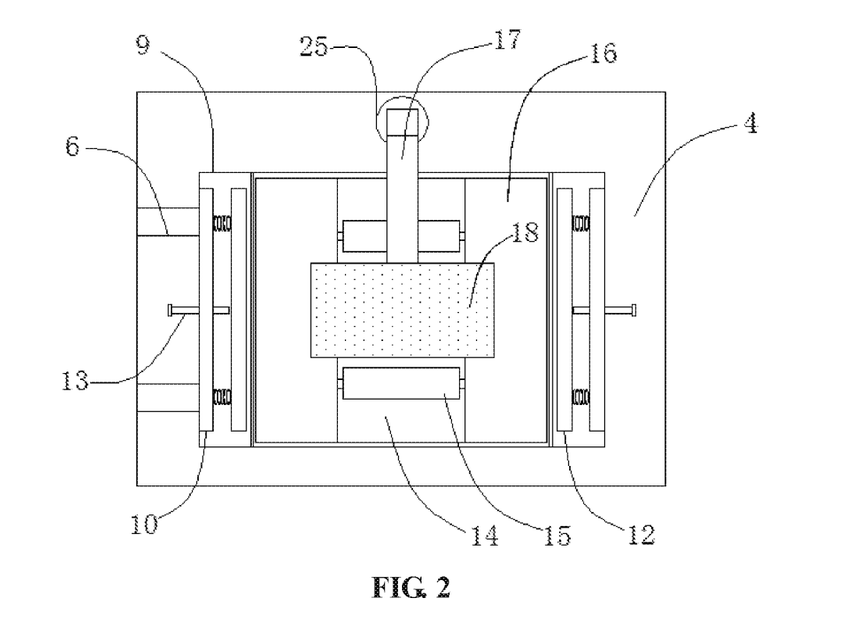
FIG. 2 is a top schematic view of a support plate part of fixing device for repairing an aluminum alloy wheel hub of the present disclosure.

Preferably, the position, corresponding to the sliding position of the sliding block 7, of the support plate 4 is provided with a matched sliding rail 701, and the sliding block 7 is slidably mounted in the sliding rail 701.

By adopting the technical schemes, the matched sliding rail 701 structure is arranged, so that the sliding block 7 is convenient to slide, and the sliding block 7 moves together with the bottom plate 5 conveniently.

Figure 1:
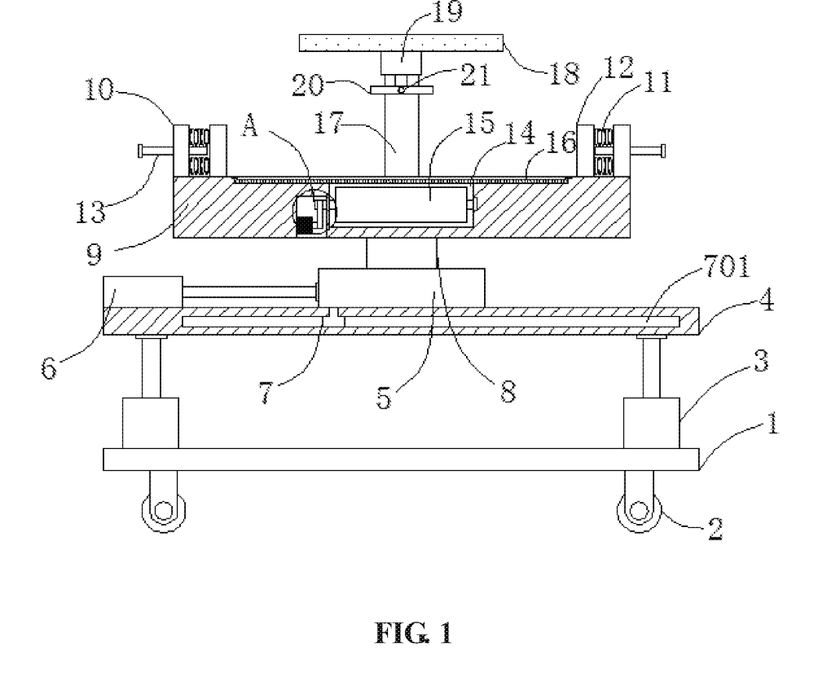
FIG. 1 is a structural diagram of a fixing device for repairing an aluminum alloy wheel hub of the present disclosure.

Preferably, the vertical plates 10 are welded on the fixing plate 9, the bottoms of the pressing plates 12 do not make contact with the fixing plate 9, and the parts, located on the other sides of the springs 11, of the pressing plates 12 are covered with rubber pads.

By adopting the technical schemes, the bottoms of the pressing plates 12 do not make contact with the fixing plate 9, thus, normal movement of the pressing plates 12 is facilitated, and through the covering rubber pads, the surface of the wheel hub can be prevented from being damaged by extrusion when the pressing plates 12 are pressed against the wheel hub.

Figure 3:
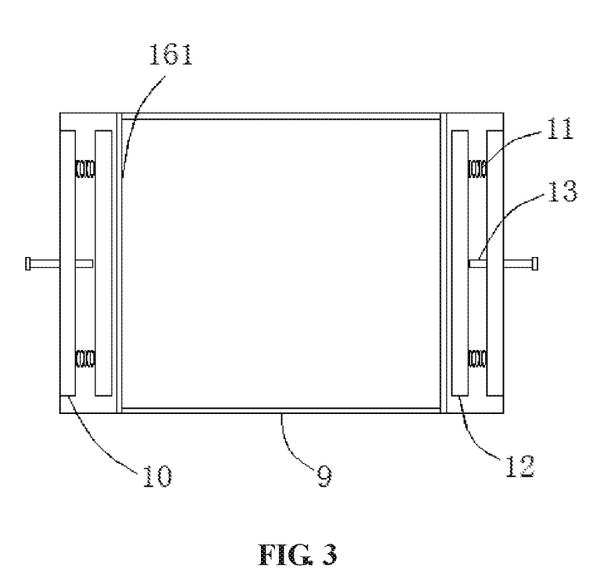
FIG. 3 is a top schematic view of a fixing plate part without a baffle of a fixing device for repairing an aluminum alloy wheel hub of the present disclosure.
Figure 4:
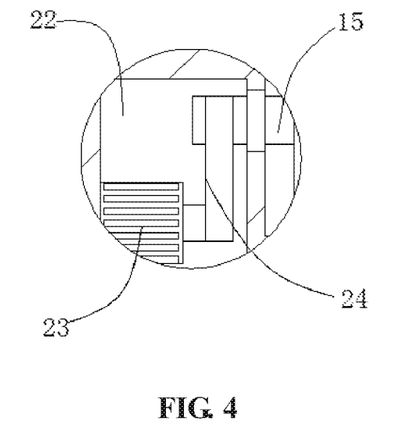
FIG. 4 is an enlarged structural diagram of a part A of the FIG. 1 of the present disclosure.

Preferably, the position, corresponding to the mounting position of the motor 23, of the fixing plate 9 is provided with a matched second groove 22.

By adopting the technical schemes, the matched second groove 22 structure is arranged, so that fixing and mounting of the motor 23 are facilitated.

Preferably, the interval between the bottoms of the baffles 16 and the guide rollers 15 is not less than 5 mm, and collecting grooves are formed in the middles of the baffles 16.

By adopting the technical schemes, a sufficient gap is reserved between the bottoms of the baffles 16 and the guide rollers 15, placement of the baffles 16 is not affected by the guide rollers 15, and through the collecting grooves formed in the baffles 16, chippings and sprayed paint generated in the repair process are collected conveniently.

Preferably, edges, corresponding to the mounting positions of the baffles 16, of the first groove 14 in the fixing plate 9 are provided with flanges 161.

By adopting the technical schemes, the flange 161 structures are arranged, so that the baffles 16 are placed at the top of the first groove 14 conveniently.

Figure 5:
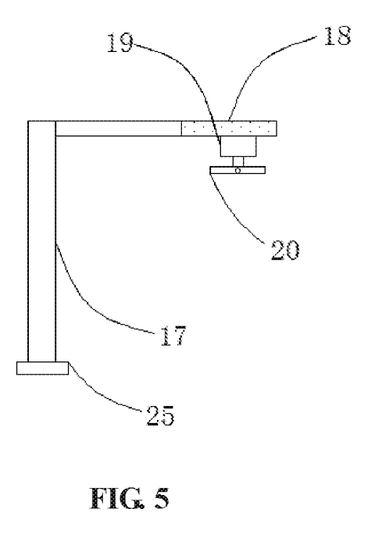
FIG. 5 is a side schematic view of a bracket part of a fixing device for repairing an aluminum alloy wheel hub of the present disclosure.

Preferably, the bottom of the bracket 17 is rotationally connected to the fixing plate 9 through the guide sleeve 25.

By adopting the technical schemes, the bracket 17 and the fixing plate 9 are connected through the guide sleeve 25, and rotation of the bracket 17 is facilitated through the guide sleeve 25 structure.

Preferably, the vertical plates 10 and the pressing plates 12 are in the same size, and the longitudinal lengths of the vertical plates 10 and the pressing plates 12 are less than the longitudinal length of the fixing plate 9.

By adopting the technical schemes, the vertical plates 10 and the pressing plates 12 are in the same size and are kept consistent.

Preferably, the top of the bracket 17 is not less than 1 m higher than the top of the fixing plate 9.

By adopting the technical schemes, a sufficient height difference is reserved, and the structure at the position of the bracket 17 is not affected by the wheel hub when the wheel hub is vertically placed.

The present disclosure further provides a using method of a fixing device for repairing an aluminum alloy wheel hub. The using method includes the following steps that:

The present disclosure further provides a using method of a fixing device for repairing an aluminum alloy wheel hub, including the following steps that:

S1, an aluminum alloy wheel hub needing to be repaired is horizontally placed on the top of a fixing plate, and pressing plates are pressed on the two sides of the wheel hub for fixing by rotating adjusting bolts on the two sides;

S2, the overall height of a support plate is adjusted through first hydraulic cylinders, and thus the height of the wheel hub on the fixing plate is adjusted for fixing and repair processing;

S3, when deformed parts of the wheel hub need to be stretched or extruded, a push plate at the bottom of a top plate is enabled to face the center of the fixing plate by rotating a bracket, the push plate is pushed by operating a second hydraulic cylinder to repair the deformed parts of the wheel hub through extrusion, or the wheel hub is pulled by a steel wire, so that the wheel hub is connected with the push plate, and the deformed parts are repaired through stretching;

S4, when the wheel hub needs to be vertically placed for repairing, baffles on the fixing plate re taken down, the wheel hub is placed on the two sets of guide rollers, and the pressing plates are pushed to attach to the plane of the wheel hub by rotating the adjusting bolts so as to limit and fix the wheel hub;

S5, when the wheel hub needs to be vertically placed for adjusting, the adjusting bolts are loosened to enable the pressing plates not to make contact with the wheel hub while the wheel hub does not incline, the motor drives one set of guide rollers to rotate, thus, the wheel hub can be driven through the guide rollers to be vertically placed and rotationally adjusted, the adjusting bolts are locked after adjustment, and the pressing plates press the wheel hub.

In sum, by placing the wheel hub on the fixing plate 9, the pressing plates 12 are pushed through the adjusting bolts 13 for clamping and fixing, the wheel hub can be clamped and fixed after the wheel hub is horizontally and vertically placed, in addition, the fixed position and height can be adjusted through the first hydraulic cylinders 3, the fixing plate 9 is rotationally connected with the bottom plate 5 through the rotating shaft 8, so that the fixed position rotation adjustment is convenient, through operation of the air cylinders 6 connected with one side of the bottom plate 5, the bottom plate 5 can be pushed to move, then a structure of the top of the bottom plate 5 is moved, thus, the position of the wheel hub is changed, and repair processing is facilitated; and meanwhile, one side of the support plate 4 is connected with the push plate 20 structure connected with the second hydraulic cylinder 19 arranged at the bottom of the top plate 18 through the bracket 17, the push plate 20 can be pushed to move up and down through the second hydraulic cylinder 19, thus, the deformed parts of the wheel hub are subjected to stretching or extruding repair conveniently, and application is convenient.

The invention claimed is:

1. A fixing device for repairing an aluminum alloy wheel hub, comprising a base and universal wheels connected with the bottom of the base through support legs, wherein the two sides of the top of the base are connected with a support plate through first hydraulic cylinders; a bottom plate is slidably mounted on the support plate through a sliding block; one side of the bottom plate is connected with air cylinders; the top of the bottom plate is connected with a fixing plate through a rotating shaft mounted rotationally; corresponding sides of vertical plates at the two sides of the fixing plate are each connected with a pressing plate through two sets of springs; adjusting bolts penetrate through the middles of the vertical plates; a first groove is formed in the middle of the fixing plate; two sets of guide rollers are rotationally mounted in the first groove; one set of the guide rollers are in drive connection with a motor mounted on one side of the bottom of the fixing plate through a belt; baffles are provided on the fixing plate at the tops of the guide rollers; a bracket is rotationally mounted at the position, located on one side of the fixing plate, above the support plate; a top plate is fixedly mounted at the top of the bracket; a push plate is connected with the bottom of the top plate through a second hydraulic cylinder; the center point of the push plate coincides with the center point of the fixing plate; and the push plate is provided with a positioning hole.

2. The fixing device for repairing the aluminum alloy wheel hub according to claim 1, wherein the position, corresponding to the sliding position of the sliding block, of the support plate is provided with a matched sliding rail, and the sliding block is slidably mounted in the sliding rail.

3. The fixing device for repairing the aluminum alloy wheel hub according to claim 1, wherein the vertical plates are welded on the fixing plate, the bottoms of the pressing plates do not make contact with the fixing plate, and the parts, located on the other sides of the springs, of the pressing plates are covered with rubber pads.

4. The fixing device for repairing the aluminum alloy wheel hub according to claim 1, wherein the position, corresponding to the mounting position of the motor, of the fixing plate is provided with a matched second groove.

5. The fixing device for repairing the aluminum alloy wheel hub according to claim 1, wherein the interval between the bottoms of the baffles and the guide rollers is not less than 5 mm, and collecting grooves are formed in the middles of the baffles.

6. The fixing device for repairing the aluminum alloy wheel hub according to claim 1, wherein the edges, corresponding to the mounting positions of the baffles, of the first groove in the fixing plate are provided with flanges.

7. The fixing device for repairing the aluminum alloy wheel hub according to claim 1, wherein the bottom of the bracket is rotationally connected to the fixing plate through a guide sleeve.

8. The fixing device for repairing the aluminum alloy wheel hub according to claim 1, wherein the vertical plates and the pressing plates are in the same size, the longitudinal lengths of the vertical plates and the pressing plates are less than the longitudinal length of the fixing plate.

9. The fixing device for repairing the aluminum alloy wheel hub according to claim 1, wherein the top of the bracket is not less than 1 m higher than the top of the fixing plate.

\* \* \* \* \*